United States Patent
Nam et al.

(10) Patent No.: US 12,041,409 B2
(45) Date of Patent: Jul. 16, 2024

(54) ELECTRONIC HEADSET DEVICE CAPABLE OF RECEIVING RADIO SIGNAL, AND ELECTRONIC DEVICE CONNECTED THEREWITH

(71) Applicant: Samsung Electronics Co., Ltd., Gyeonggi-do (KR)

(72) Inventors: Janghyun Nam, Gyeonggi-do (KR); Dongil Yang, Gyeonggi-do (KR); Hyoseok Na, Gyeonggi-do (KR); Gyesung Wang, Gyeonggi-do (KR); Wonho Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 232 days.

(21) Appl. No.: 17/683,661

(22) Filed: Mar. 1, 2022

(65) Prior Publication Data

US 2022/0191611 A1  Jun. 16, 2022

Related U.S. Application Data

(63) Continuation of application No. PCT/KR2020/012556, filed on Sep. 17, 2020.

(30) Foreign Application Priority Data

Sep. 18, 2019  (KR) .................. 10-2019-0114665

(51) Int. Cl.
*H04R 1/10* (2006.01)
*H04B 1/10* (2006.01)

(52) U.S. Cl.
CPC ............. *H04R 1/1041* (2013.01); *H04B 1/10* (2013.01); *H04R 1/1075* (2013.01);
(Continued)

(58) Field of Classification Search
CPC .. H04R 1/1041; H04R 1/1075; H04R 1/1091; H04R 2420/07; H04R 2420/09; H04B 1/10
(Continued)

(56) References Cited

U.S. PATENT DOCUMENTS 8,543,061 B2  9/2013  Suhami
8,742,995 B2  6/2014  Park
(Continued)

FOREIGN PATENT DOCUMENTS

JP  2007-150386 A  6/2007
KR  10-2003-0063496 A  7/2003
(Continued)

OTHER PUBLICATIONS

Korean Office Action dated Aug. 28, 2023.

*Primary Examiner* — Thjuan K Addy
(74) *Attorney, Agent, or Firm* — Cha & Reiter, LLC

(57) ABSTRACT

An electronic headset device, comprising a headset housing; a speaker disposed inside the headset housing; a connector for connecting with an external electronic device; an audio IC module electrically connected with the connector and configured to convert a digital audio signal into an analogue audio signal; a connection line for electrically connecting the speaker with the audio IC module; a radio IC module disposed on the path of the connection line and electrically connected to the connection line; and a radio antenna connected to the radio IC module, wherein the radio IC module may be configured to use the radio antenna to receive a radio signal.

16 Claims, 11 Drawing Sheets

(52) U.S. Cl.
CPC ....... *H04R 1/1091* (2013.01); *H04R 2420/07* (2013.01); *H04R 2420/09* (2013.01)

(58) Field of Classification Search
USPC .............................. 381/74, 68, 75, 317, 94.1
See application file for complete search history.

(56) References Cited

U.S. PATENT DOCUMENTS

| | | |
|---|---|---|
| 9,509,044 B2 | 11/2016 | Wu et al. |
| 10,045,118 B2 | 8/2018 | Caldwell et al. |
| 2006/0025170 A1* | 2/2006 | Hayashida ........ H04W 52/0274 455/90.2 |
| 2009/0169044 A1 | 7/2009 | Kashiwagi et al. |
| 2013/0170664 A1 | 7/2013 | Schwager |
| 2015/0256953 A1* | 9/2015 | Kwatra ................ H04R 1/1083 381/58 |

FOREIGN PATENT DOCUMENTS

| | | |
|---|---|---|
| KR | 10-2003-0068314 A | 10/2003 |
| KR | 10-0447997 B1 | 9/2004 |
| KR | 10-0664238 B1 | 1/2007 |
| KR | 10-0866926 B1 | 11/2008 |
| KR | 10-2011-0080306 A | 7/2011 |
| KR | 10-1077365 B1 | 10/2011 |

* cited by examiner

ELECTRONIC HEADSET DEVICE CAPABLE OF RECEIVING RADIO SIGNAL, AND ELECTRONIC DEVICE CONNECTED THEREWITH

CROSS-REFERENCE TO RELATED APPLICATION(S)

This application is a continuation of International Application No. PCT/KR2020/012556, filed on Sep. 17, 2020, which claims priority to Korean Patent Application No. 10-2019-0114665, filed on Sep. 18, 2019 in the Korean Intellectual Property Office, the disclosures of which are herein incorporated by reference.

BACKGROUND

1. Field

Certain embodiments of the disclosure relate to a headset electronic device and an electronic device connected to the headset electronic device.

2. Description of Related Art

Various electronic devices, such as smartphones, tablet personal computers (PCs), portable multimedia players (PMPs), personal digital assistants (PDAs), laptop PCs, and/or wearable devices, may provide various types of content to users to provide diverse user experiences. For example, personal digital assistants (PDAs), also known as handheld computers, pocket computers, and palmtops provide users with communication, entertainment and wireless capabilities. As a further example, live radio can be broadcast from a user's phone or tablet anywhere in the world over a cellular network or home wi-fi.

When an electronic device, such as a PDA, is connected to an external electronic device, such as a headset or earphones, the external electronic device may include an antenna for receiving radio broadcasts. The electronic device may receive a radio broadcast signal using the antenna included in the external electronic device, and output the radio broadcast through a speaker equipped in the external electronic device or the electronic device by using a radio broadcast processor that processes the radio broadcast signal.

When the electronic device receives a radio broadcast signal by using an external electronic device, such as earphones or a headset as an antenna, the received signal may be transmitted from the external device to the electronic device through a connector. The radio reception performance of the radio broadcast signal may decrease due to noise caused by data signals transmitted and received through the connector or other components in the electronic device.

Certain embodiments of the disclosure are directed to increase the radio broadcast performance of a headset electronic device or an electronic device.

SUMMARY

According to certain embodiments, a headset electronic device, comprises: a headset housing; a speaker disposed inside the headset housing; a connector for connection with an external electronic device; an audio IC electrically connected to the connector and configured to convert a digital audio signal into an analog audio signal; a connection line electrically connecting the audio IC and the speaker; a radio IC disposed on a path of the connection line and electrically connected to the connection line; and a radio antenna connected to the radio IC, wherein the radio IC may be configured to receive a radio signal by using the radio antenna.

According to certain embodiments, an electronic device, external to, and for use with, the headset electronic device includes: a processor; a connector electrically connected to the processor and fastened to a connector of a headset electronic device so as to interconnect the headset electronic device and the electronic device, wherein the processor may be configured to transmit a control signal to a radio IC of the headset electronic device through the connector of the electronic device.

BRIEF DESCRIPTION OF THE DRAWINGS

The above and other aspects, features and advantages of certain embodiments of the present disclosure will be more apparent from the following description taken in conjunction with the accompanying drawings, in which.

DETAILED DESCRIPTION

Certain embodiments of the disclosure provide a headset electronic device which prevents deterioration of radio reception performance due to noise of transmitted and received data signals and/or other components in the electronic device. In an embodiment, the headset electronic device does not include a separate processor for processing a radio broadcast signal and may implement capabilities for radio broadcast reception.

Figure 1:
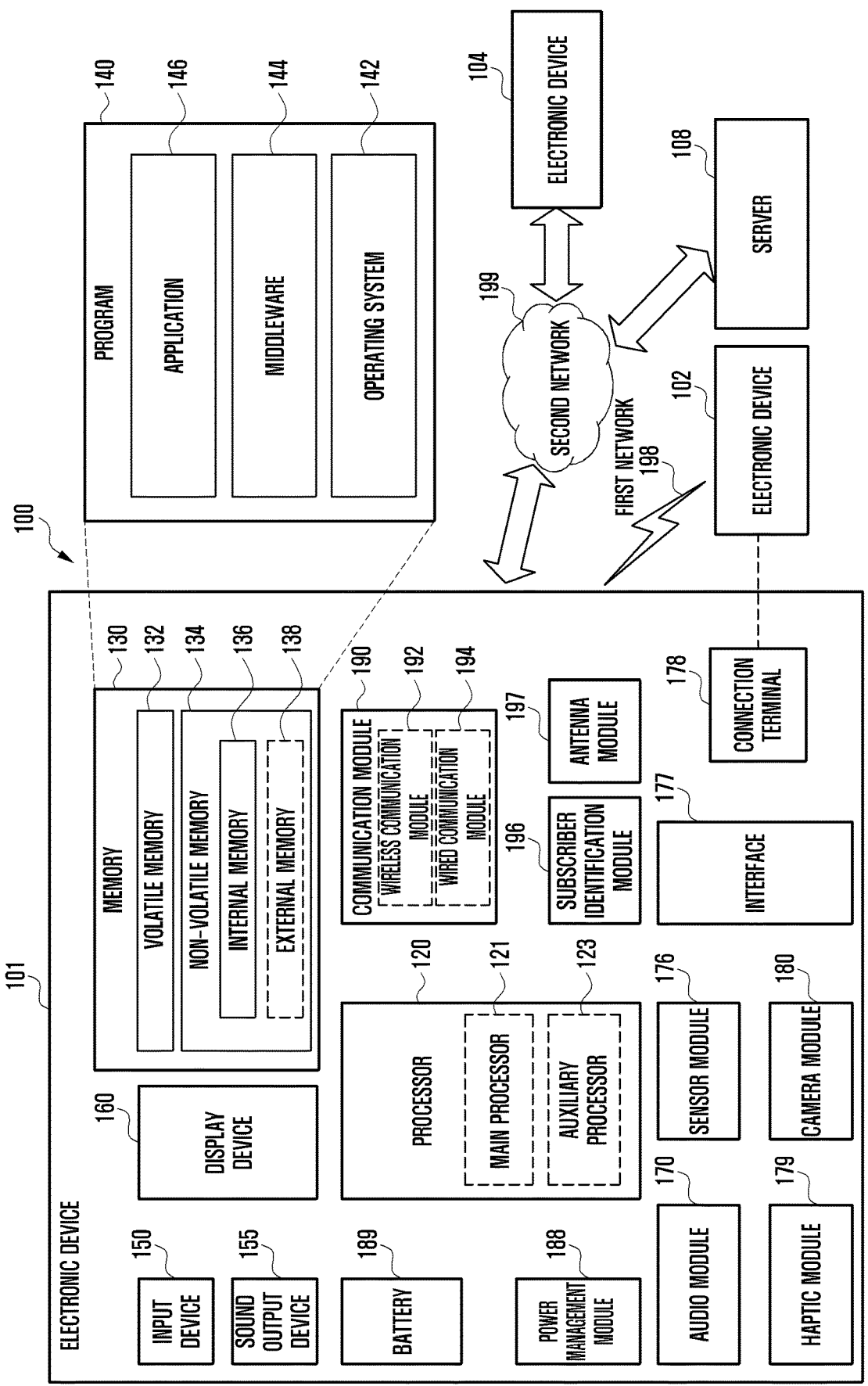
FIG. 1 is a block diagram of an electronic device in a network environment according to certain embodiments of the disclosure.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In certain embodiments, one or more of the components may be omitted from the electronic device 101, (e.g., the display device 160 or the camera module 180) or one or more other components may be added in the electronic device 101. In certain embodiments, one or more of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 of electronic device 101 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. The auxiliary processor 123 may, additionally or alternatively, be adapted to consume less power than the main processor 121. The auxiliary processor 123 may be dedicated to a specified function. The auxiliary processor 123 may be implemented as separate from, or as part of, the main processor 121.

When the main processor 121 is in either an inactive (e.g., sleep) state or an active state (e.g., executing an application), the auxiliary processor 123 may control at least some of functions or states related to at least one component (e.g., the display device 160, the sensor module 176, or the communication module 190) among the components of the electronic device 101. According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data from a user of the electronic device to be used by one or more components (e.g., the processor 120) of the electronic device 101. The input device 150 may include, for example, a microphone, a mouse, a keyboard, or a digital pen (e.g., a stylus pen).

The sound output device 155 may output sound signals from the electronic device 101. The sound output device 155 may include, for example, a speaker or a receiver. The speaker may be used for general purposes, such as playing multimedia or playing a record. The receiver may be also used for receiving incoming calls. According to an embodiment, the receiver may be implemented as separate from, or as part of the speaker.

The display device 160 may visually provide information to a user of the electronic device 101. The display device 160 may include, for example, a display, a hologram device, or a projector and associated control circuitry. According to an embodiment, the display device 160 may include touch circuitry adapted to detect a user's touch, or sensor circuitry (e.g., a pressure sensor) adapted to measure the intensity of force incurred by the touch.

The audio module 170 may convert audio into an electrical signal and vice versa. According to an embodiment, the audio module 170 may receive audio via the input device 150 and output the audio via the sound output device 155 or a headphone of an external electronic device (e.g., an electronic device 102) coupled with the electronic device 101 via direct (e.g., wired) or wireless coupling means.

The sensor module 176 may detect an operational state (e.g., power or temperature) of the electronic device 101 or an environmental state (e.g., a state of a user) external to the electronic device 101, and generate therefrom an electrical signal or data value corresponding to the detected state. According to an embodiment, the sensor module 176 may include, for example, one or more of a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, an illuminance sensor.

The interface 177 may support one or more specified protocols to be used for the electronic device 101 to be coupled with the external electronic device (e.g., the electronic device 102) via a direct (e.g., wired) or wireless coupling means. According to an embodiment, the interface 177 may include, for example, a high-definition multimedia interface (HDMI), a universal serial bus (USB) interface, a secure digital (SD) card interface, an audio interface.

A connecting terminal 178 may include a connector whereby the electronic device 101 may be physically connected with the external electronic device (e.g., the electronic device 102). According to an embodiment, the connecting terminal 178 may include, for example, a HDMI connector, a USB connector, a SD card connector, an audio connector (e.g., a headphone connector).

The haptic module 179 may convert an electrical signal into a mechanical stimulus (e.g., a vibration or a movement) or electrical stimulus which may be recognized by a user via tactile sensation and/or kinesthetic sensation. According to an embodiment, the haptic module 179 may include, for example, a motor, a piezoelectric element, an electric stimulator.

The camera module 180 may capture a still image and/or moving images. According to an embodiment, the camera module 180 may include one or more lenses, image sensors, image signal processors, flashes.

The power management module 188 may manage power supplied to the electronic device 101. According to one embodiment, the power management module 188 may be implemented, for example, as at least part of a power management integrated circuit (PMIC).

The battery 189 may supply power to at least one component of the electronic device 101. According to an embodiment, the battery 189 may include, for example, a primary cell which is not rechargeable, a secondary cell which is rechargeable, a fuel cell.

The communication module 190 may support establishing a direct (e.g., wired) communication channel or a wireless communication channel between the electronic device 101 and the external electronic device (e.g., the electronic device 102, the electronic device 104, or the server 108) and perform communication via the established communication channel. The communication module 190 may include one or more communication processors that are operable independently from the processor 120 (e.g., the application processor (AP)) for supporting a direct (e.g., wired) communication or a wireless communication. According to an embodiment, the communication module 190 may include a wireless communication module 192 (e.g., a cellular communication module, a short-range wireless communication module, a global navigation satellite system (GNSS) communication module), a wired communication module 194 (e.g., a local area network (LAN) communication module or a power line communication (PLC) module). The communication module 190 may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). The communication module 190 may be implemented as a single component (e.g., a single chip), or may otherwise be implemented as multiple components (e.g., multiple chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 of the electronic device 101 may transmit or receive a signal or power to or from an external source (e.g., the external electronic device). According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna from among the plurality of antennas may be selected by the communication module 190 (e.g., the wireless communication module 192) that is deemed appropriate for a communication scheme used in the communication network, such as the first network 198 or the second network 199. The signal or the power may then be transmitted or received between the communication module 190 and the external electronic device via the selected at least one antenna. According to an embodiment, an additional component (e.g., a radio frequency integrated circuit (RFIC)) other than the radiating element may be additionally included as part of the antenna module 197.

At least some of the above-described components may be mutually coupled and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of the same typeor different type from the electronic device 101. According to an embodiment, all or some of operations to be executed at the electronic device 101 may be executed at one or more of the external electronic devices 102, 104, or 108. For example, if the electronic device 101 performs a function or a service automatically, or in response to a request from a user or another device, the electronic device 101, may request the one or more external electronic devices to perform at least part of the function or the service. The one or more external electronic devices receiving the request may perform at least part of the function or the service requested, or an additional function or an additional service related to the request, and transfer the result to the electronic device 101. The electronic device 101 may provide the result received from the one or more external devices with or without further processing of the result, as at least part of a reply to the request. To that end, a cloud computing, distributed computing, or client-server computing technology may be used, for example.

Figure 2:
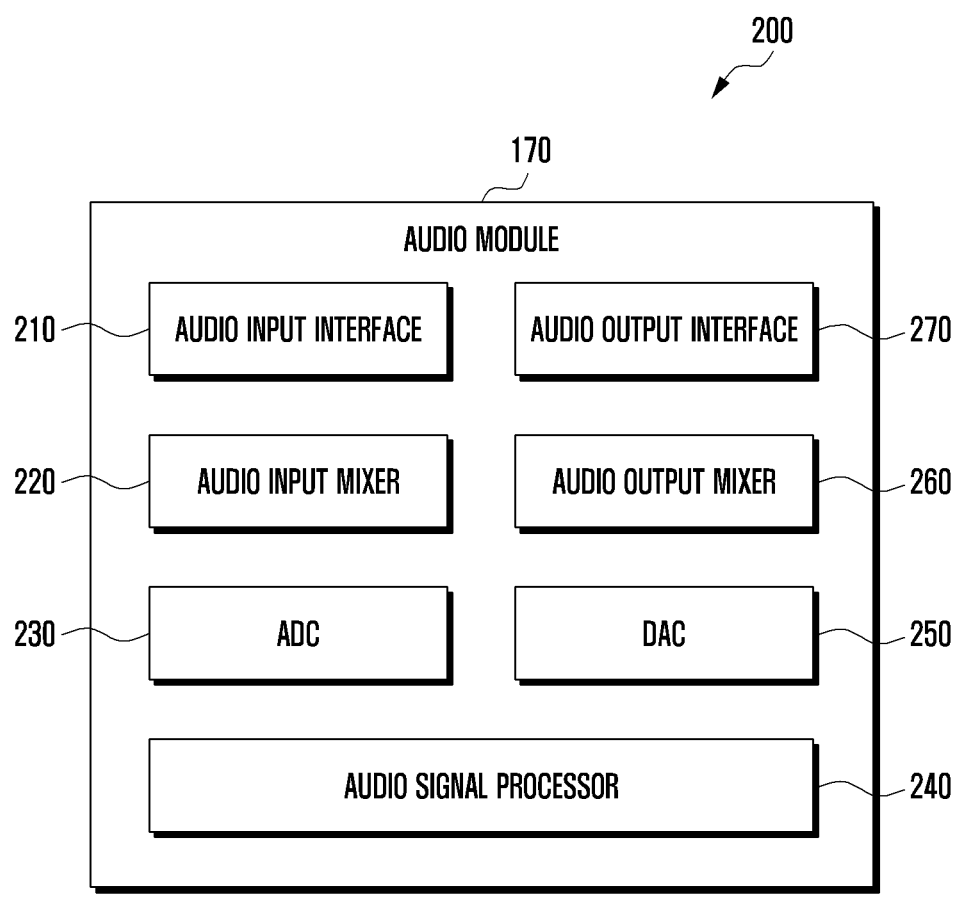
FIG. 2 is a block diagram of an audio IC according to certain embodiments of the disclosure.

FIG. 2 is a block diagram 200 illustrating the audio IC 170 module according to certain embodiments. Referring to FIG. 2, the audio IC 170 module may include, for example, an audio input interface 210, an audio input mixer 220, an analog-to-digital converter (ADC) 230, an audio signal processor 240, a digital-to-analog converter (DAC) 250, an audio output mixer 260, an audio output interface 270.

The audio input interface 210 of the audio IC 170 module may receive an audio signal corresponding to an external sound source via a microphone (e.g., a dynamic microphone, a condenser microphone, or a piezo microphone) that is configured as part of the input device 150 or separately from the electronic device 101. For example, if an audio signal is obtained from the external electronic device 102 (e.g., a headset or a microphone), the audio input interface 210 may be connected with the external electronic device 102 directly (e.g., wired) via the connecting terminal 178, or wirelessly (e.g., Bluetooth™ communication) via the wireless communication module 192 to receive the audio signal. According to an embodiment, the audio input interface 210 may receive a control signal (e.g., a volume adjustment signal received via an input button) related to the audio signal obtained from the external electronic device 102. The audio input interface 210 may include a plurality of audio input channels and may receive a different audio signal for each of the plurality of audio input channels, respectively. According to an embodiment, additionally or alternatively, the audio input interface 210 may receive an audio signal from a source internal to the electronic device 101 (e.g., the processor 120 or the memory 130).

The audio input mixer 220 of the audio IC 170 module may synthesize a plurality of input audio signals into at least one composite audio signal. For example, according to an embodiment, the audio input mixer 220 may synthesize a plurality of analog audio signals input via the audio input interface 210 into at least one composite analog audio signal.

The ADC 230 of the audio IC 170 module may convert an analog audio signal into a digital audio signal. For example, according to an embodiment, the ADC 230 may convert an analog audio signal received via the audio input interface 210 or, additionally or alternatively, an analog audio signal synthesized via the audio input mixer 220 into a digital audio signal.

The audio signal processor 240 of the audio IC 170 module may perform various processing operations on a digital audio signal received via the ADC 230 or a digital audio signal received from another component of the electronic device 101. For example, according to an embodiment, the audio signal processor 240 may perform operations directed to changing a sampling rate, applying one or more filters, interpolation processing, amplifying or attenuating a whole or partial frequency bandwidth, noise processing (e.g., attenuating noise or echoes), changing channels (e.g., switching between mono and stereo), mixing, or extracting a specified signal for one or more digital audio signals. According to an embodiment, one or more functions of the audio signal processor 240 may be implemented in the form of an equalizer.

The DAC 250 of the audio IC 170 module may convert a digital audio signal into an analog audio signal. For example, according to an embodiment, the DAC 250 may convert a digital audio signal processed by the audio signal processor 240 or a digital audio signal obtained from another component of the electronic device 101 (e.g., the processor (120) or the memory (130)) into an analog audio signal.

The audio output mixer 260 of the audio IC 170 module may synthesize a plurality of output audio signals into at least one composite audio signal. For example, according to an embodiment, the audio output mixer 260 may synthesize a first analog audio signal converted by the DAC 250 and a second analog audio signal (e.g., an analog audio signal received via the audio input interface 210) into at least one composite analog audio signal.

The audio output interface 270 of the audio IC 170 module may output an analog audio signal converted by the DAC 250 or, additionally or alternatively, an analog audio signal synthesized by the audio output mixer 260 from the electronic device 101 via the sound output device 155. The sound output device 155 may include, for example, a speaker, such as a dynamic driver or a balanced armature driver, or a receiver. According to an embodiment, the sound output device 155 may include a plurality of speakers. In such a case, the audio output interface 270 may output audio signals having a plurality of different channels (e.g., stereo channels or 5.1 channels) via at least some of the plurality of speakers. According to an embodiment, the audio output interface 270 may be connected with the external electronic device 102 (e.g., an external speaker or a headset) directly via the connecting terminal 178 or wirelessly via the wireless communication module 192 to output an audio signal.

According to an embodiment, the audio IC 170 module may generate, without separately including the audio input mixer 220 or the audio output mixer 260, at least one digital audio signal by synthesizing a plurality of digital audio signals using at least one function of the audio signal processor 240.

According to an embodiment, the audio IC 170 module may include an audio amplifier (not shown) (e.g., a speaker amplifying circuit) that is capable of amplifying an analog audio signal received from the audio input interface 210 or an output audio signal via the audio output interface 270. According to an embodiment, the audio amplifier may be configured as a module separate from the audio IC 170.

Figure 3A:
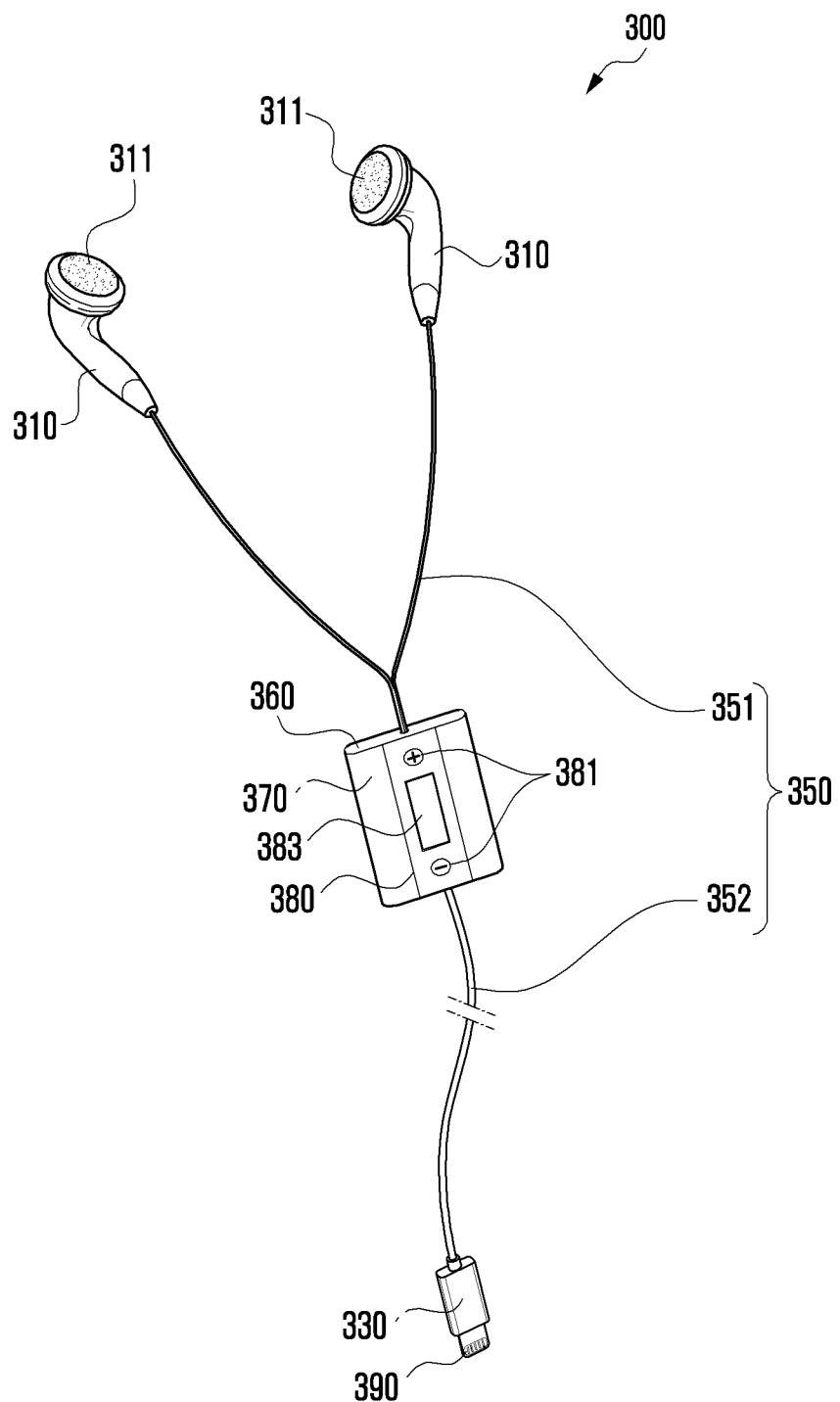
FIGS. 3A to 3C are diagrams of a headset electronic device according to certain embodiments of the disclosure.

FIG. 3A is a diagram of a headset electronic device 300 according to certain embodiments.

With reference to FIG. 3A, the headset electronic device 300 may include headset housings 310, speakers 311, an audio IC 330, a connection line 350, a radio IC 370, a radio antenna (e.g., radio antenna 514 in FIG. 5A), and a connector 390.

According to an embodiment, a pair of headset housings 310 may be provided for each ear of the user.

The speaker 311 may be disposed inside the headset housing 310. For example, since a pair of headset housings 310 may be provided, a pair of speakers 311 may be respectively provided and disposed inside the pair of headset housings 310. The speaker 311 may be electrically connected to the audio IC 330 through the connection line 350. The speaker 311 may include a unit such as a dynamic driver unit or a balanced armature driver unit. The speaker 311 may output an analog audio signal transmitted over the connection line 350 through one of the dynamic driver unit or balanced armature driver unit. Further, the speaker 311 may output audio through various driver unit.

According to certain embodiments, the audio IC 330 may be operated using power sourced from an electronic device (e.g., the electronic device 101 in FIG. 1) transmitted through the connector 390. According to certain embodiments, the audio IC 330 may be operated using a battery (e.g., battery 516 in FIG. 5C) included in the headset electronic device 300.

According to certain embodiments, the audio IC 330 may convert a digital audio signal into an analog audio signal. For example, the audio IC 330 may be implemented as the audio IC shown in FIG. 2 (e.g., audio IC 170 in FIG. 2). As shown in FIG. 3A, the audio IC 330 may be integrally formed with the connector 390. The audio IC 330 may convert a digital audio signal received from the electronic device (e.g., electronic device 101 in FIG. 1) through the connector 390 into an analog audio signal and transmit the signal to the speaker 311 through the connection line 350. In this manner, the audio IC 330 may process an input audio signal received from the electronic device and output an output audio signal corresponding to the audio input through the speaker 311.

According to certain embodiments, the audio IC 330 may convert an analog audio signal corresponding to the radio signal processed by the radio IC 370 into a digital audio signal. The digital audio signal may then be transmitted to the electronic device through the connector 390.

According to certain embodiments, the connection line 350 may electrically connect the speaker 311 and the audio IC 330. The connection line 350 may include a first line 351 connecting the radio IC 370 and the speakers 311, and a second line 352 connecting the radio IC 370 and the audio IC 330. For example, to electrically connect the speaker 311 and the audio IC 330, a metal wire may be disposed inside the connection line 350, thus allowing an electrical signal to be transferred or power to be transmitted through the metal wire. The wire may be made of various conductive materials other than metal. In an embodiment, a wire cover may wrap the wire on the outer surface of the connection line 350 so as to protect the wire and to electrically isolate both the inside and outside of the connection line 350. The wire cover may be made of a flexible synthetic resin material so that the connection line 350 may have flexibility. The wire cover may be made of various other materials that protect the wire and have insulating properties.

According to certain embodiments, the radio IC 370 may be disposed inside a housing 360. The radio IC 370 may be operated using power of the electronic device supplied through the connector 390. According to certain embodiments, the radio IC 370 may be operated through a battery (e.g., battery 516 in FIG. 5C) included in the headset electronic device 300. As shown in FIG. 3A, the radio IC 370 may be disposed to be spaced apart from the audio IC 330. Any deterioration in the quality of a radio signal received by the radio IC 370 that may occur due to noise generated during operation of the audio IC 330 may be reduced by virtue of the spacing between the radio IC 370 and the audio IC 330.

According to certain embodiments, the radio IC 370 may process a radio signal. The radio IC 370 may receive a radio signal of a specific frequency. The radio IC 370 may filter the frequency by using frequency resonance techniques in order to receive a frequency of a specific channel from among all received broadcast radio signals. For example, the radio IC 370 may vary the resonant frequency of a frequency-variable band pass filter (BPF) included therein to match the frequency of a specific channel. By varying the resonant frequency of the frequency-variable BPF to the frequency of a specific channel, the frequency of the specific channel may be resonated and filtered. Radio signals undergo a modulation process for transmission, and the radio IC 370 may extract or amplify an audio signal from a modulated radio signal. The radio signal processed by the radio IC 370 may be at least one of frequency modulation (FM) signal, amplitude modulation (AM) signal, digital multimedia broadcasting (DMB) signal, digital audio broadcasting+(DAB+) signal, or integrated services digital broadcasting-terrestrial (ISDB-T) signal.

According to certain embodiments, the radio IC 370 may be controlled by a control signal input to the electronic device. When a control signal is input to the electronic device, the control signal may be transmitted to the radio IC 370 through the connector 390, and the radio IC 370 may process a radio signal based on the received control signal. The control signal may include, for example, a volume control signal or a radio channel selection signal. The radio IC 370 may determine the degree of amplification of the audio signal based on the volume control signal, and may determine the resonance frequency based on the radio channel selection signal.

According to certain embodiments, the radio IC 370 included in the headset electronic device 300 may process a received radio signal. The processed analog audio signal may be directly transmitted to the speaker 311. Since the analog audio signal processed by the radio IC 370 is transmitted directly to the speakers 311 and does not pass through other circuits, the possibility of adding noise may be reduced. Hence, the headset electronic device 300 according to various embodiments disclosed in this document may provide high-quality radio sound to the user.

According to certain embodiments, the speaker controller 380 may include a volume button 381 and a play button 383. The volume button 381 may be a button capable of receiving a user's input. For example, when the user's input is a pressure force, the volume button 381 may be a button that can be moved by pressure applied by the user. As another example, when the user's input is a touch input, the volume button 381 may be a capacitive touch sensor that recognizes a touch. The volume button 381 may include a button for increasing the volume and a button for decreasing the volume. The user input received through the volume button 381 may be transmitted to the electronic device (e.g., electronic device 101 in FIG. 1) connected to the headset electronic device 300, and the processor (e.g., processor 120 in FIG. 1) or audio IC (e.g., audio IC 170 in FIG. 1) of the electronic device may process the user input to adjust the volume. The volume-adjusted audio signal may be transmitted to the speaker 311 through the first line 351. Thereby, the volume of the sound output through the speaker 311 may be adjusted by the user.

According to certain embodiments, the play button 383 may be a button capable of receiving a user's input. For example, the play button 383 may also be a button that can be moved by pressure or a capacitive touch sensor. The user input received through the play button 383 may be transmitted to the electronic device connected to the headset electronic device 300, and the processor (e.g., processor 120 in FIG. 1) or audio IC (e.g., audio IC 170 in FIG. 1) of the electronic device may process the user input. Thereby, sound may or may not be output through the speaker 311 dependent upon a current state of the play button 383.

Figure 3B:
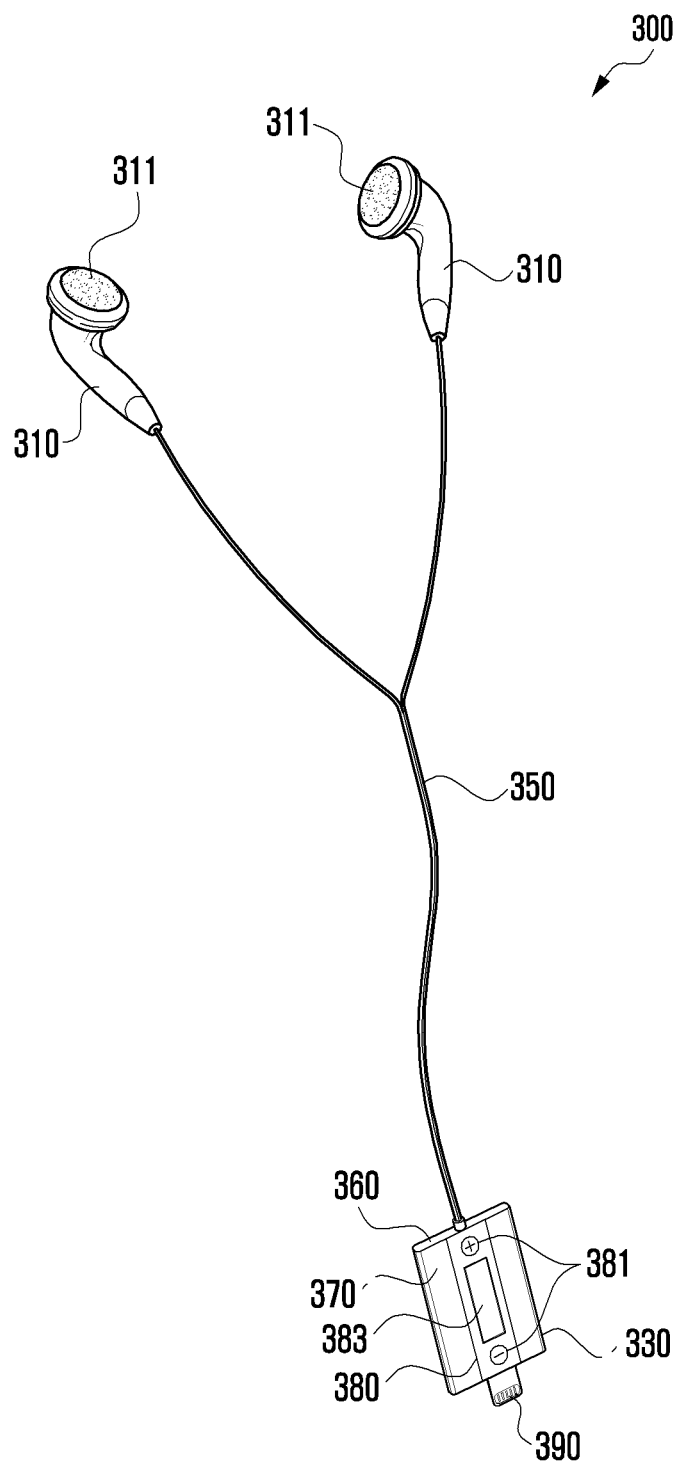

FIG. 3B is a diagram of a headset electronic device 300 according to certain embodiments. The same reference symbols are used for the same components as those of FIG. 3A, and detailed descriptions thereof will be omitted.

According to certain embodiments, as shown in FIG. 3B, the radio IC 370 and the audio IC 330 may be disposed in one housing 360. For example, the radio IC 370 and the audio IC 330 may be mounted on a printed circuit board (PCB) disposed in the housing 360. In this case, a noise blocking circuit may be mounted between the radio IC 370 and the audio IC 330 so that noise generated from the audio IC 330 does not interfere with the radio IC 370 or the radio antenna.

According to certain embodiments, a noise shielding member capable of shielding noise may be disposed between the audio IC 330 and the radio IC 370.

According to certain embodiments, mutual interference due to noise may be reduced by separating the ground electrodes of the audio IC 330 and the radio IC 370 from each other.

Figure 3C:
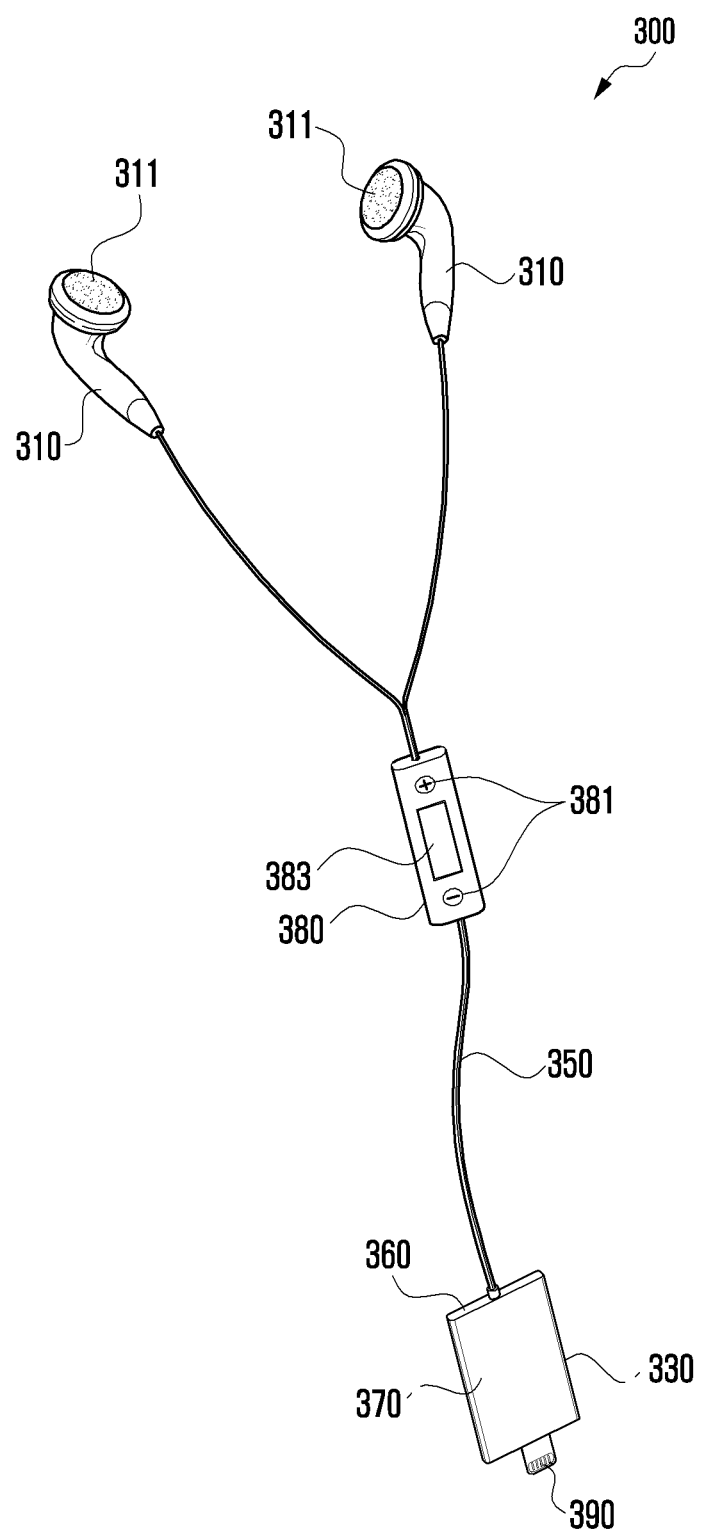

FIG. 3C is a diagram of a headset electronic device 300 according to certain embodiments. The same reference symbols are used for the same components as those of FIG. 3B, and detailed descriptions thereof will be omitted.

According to certain embodiments, the radio IC 370 and the audio IC 330 may be disposed in one housing 360 similar to the embodiment shown in FIG. 3B, and a speaker controller 380 may be installed on the connection line 350.

According to certain embodiments, the speaker controller 380 may include a volume button 381 and/or a play button 383. The volume button 381 may be a button capable of receiving a user's input. For example, when the user's input is physical pressure, the volume button 381 may be a button that can be moved by the pressure applied by the user. As another example, when the user's input is a touch input, the volume button 381 may be a capacitive touch sensor that recognizes a touch. The volume button 381 may include a button for increasing the volume or a button for decreasing the volume. The user input received through the volume button 381 may be transmitted to the electronic device connected to the headset electronic device 300, and the processor (e.g., processor 120 in FIG. 1) or audio IC module (e.g., audio IC module 170 in FIG. 1) of the electronic device may process the user input to adjust the volume. The volume-adjusted audio signal may be transmitted to the speaker 311 through the first line 351 of the connection line 350. Thereby, the volume of the sound output through the speaker 311 may be adjusted by the user.

According to certain embodiments, the play button 383 may be a button capable of receiving a user's input. For example, the play button 383 may also be a button that can be moved by pressure or a capacitive touch sensor. The user input received through the play button 383 may be transmitted to the electronic device connected to the headset electronic device 300, and the processor (e.g., processor 120 in FIG. 1) or audio IC module (e.g., audio IC module 170 in FIG. 1) of the electronic device may process the user input. Thereby, sound may or may not be output through the speaker 311.

Figure 4A:
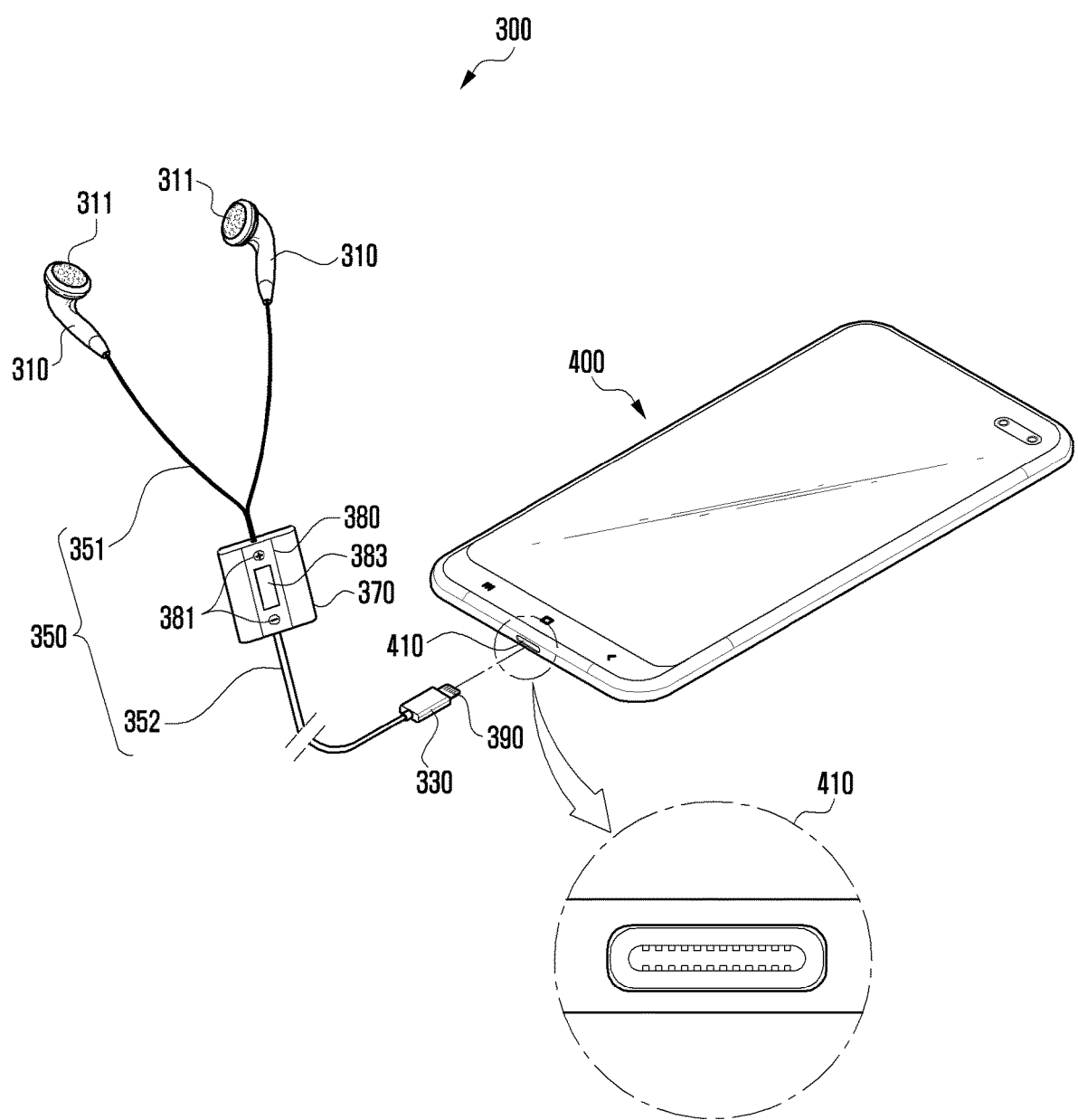
FIG. 4A is a diagram of a headset electronic device and an electronic device according to certain embodiments of the disclosure.
Figure 4B:
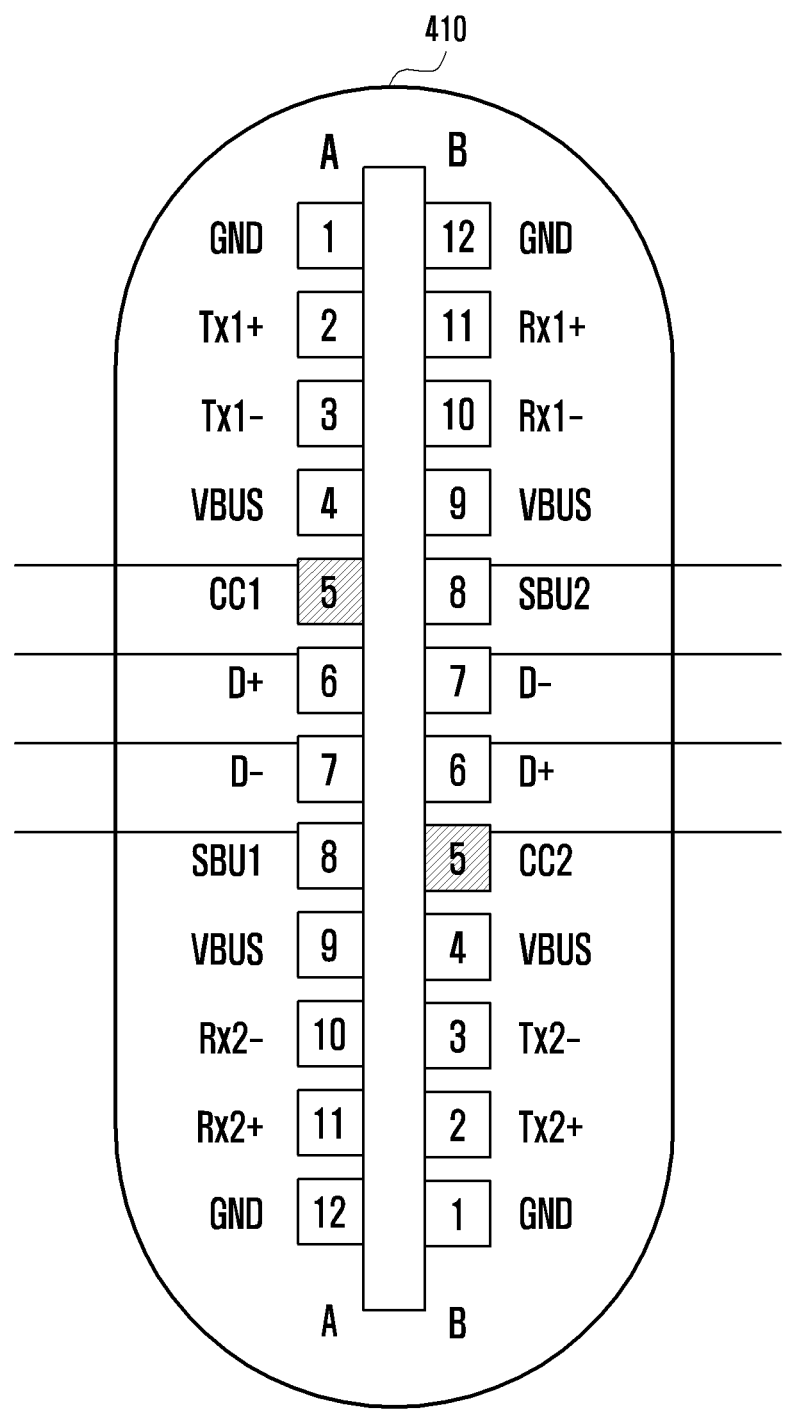
FIG. 4B is a diagram illustrating a configuration of pins included in a connector of the electronic device according to certain embodiments of the disclosure.

FIG. 4A is a diagram of a headset electronic device 300 and an electronic device 400. FIG. 4B is a diagram illustrating a configuration of pins included in the connector 410 of the electronic device 400 of FIG. 4A.

As shown in FIG. 4A, the connector 390 of the headset electronic device 300 may be electrically connected to the audio IC module 330. The connector 390 of the headset electronic device 300 may be coupled to the connector 410 (e.g., connection terminal 178 in FIG. 1) of the electronic device 400 (e.g., electronic device 101 in FIG. 1). For example, the electronic device 400 may be implemented as, but not limited to, a portable electronic device such as a smartphone or a tablet PC, and an electronic device 400 that includes a connector 410 to which the headset electronic device 300 can be connected. The electronic device 400 is capable of transmitting and receiving data (e.g., multimedia data such as audio data, other control commands) to and from the headset electronic device 300 connected through the connector 350.

According to certain embodiments, the connectors 390 and 410 may be connectors according to the universal serial bus (USB) standard. For example, the connectors 390 and 410 may be a USB Type-C connector. As shown in FIG. 4A, the connector 410 may be disposed on one side of the electronic device 400. The connector 390 (referred to herein as "first connector 390") of the headset electronic device 300 may be inserted and fastened to the connector 410 (referred to as "second connector 410") of the electronic device 400.

According to certain embodiments, when the first connector 390 of the headset electronic device 300 is fastened to the second connector 410 of the electronic device 400, the headset electronic device 300 and the electronic device 400 may be electrically connected. Upon making an electrical connection, the headset electronic device 300 and the electronic device 400 may exchange electrical signals and power. For example, the electrical signals may include a control signal for controlling the radio IC module 370, a digital audio signal generated by the electronic device 400, or a digital radio signal processed by the radio IC module 370.

FIG. 4B illustrates a plurality of terminals that may be included in the connector when the first connector 390 and the second connector 410 conform to the USB Type-C standard. The USB Type-C connector may have 12 terminals on the left line A and 12 terminals on the right line B, which may be symmetrical to each other.

Next, a description is provided of operations that may be performed of a headset electronic device 510 and an electronic device 530 with reference to FIGS. 5A to 5D.

Figure 5A:
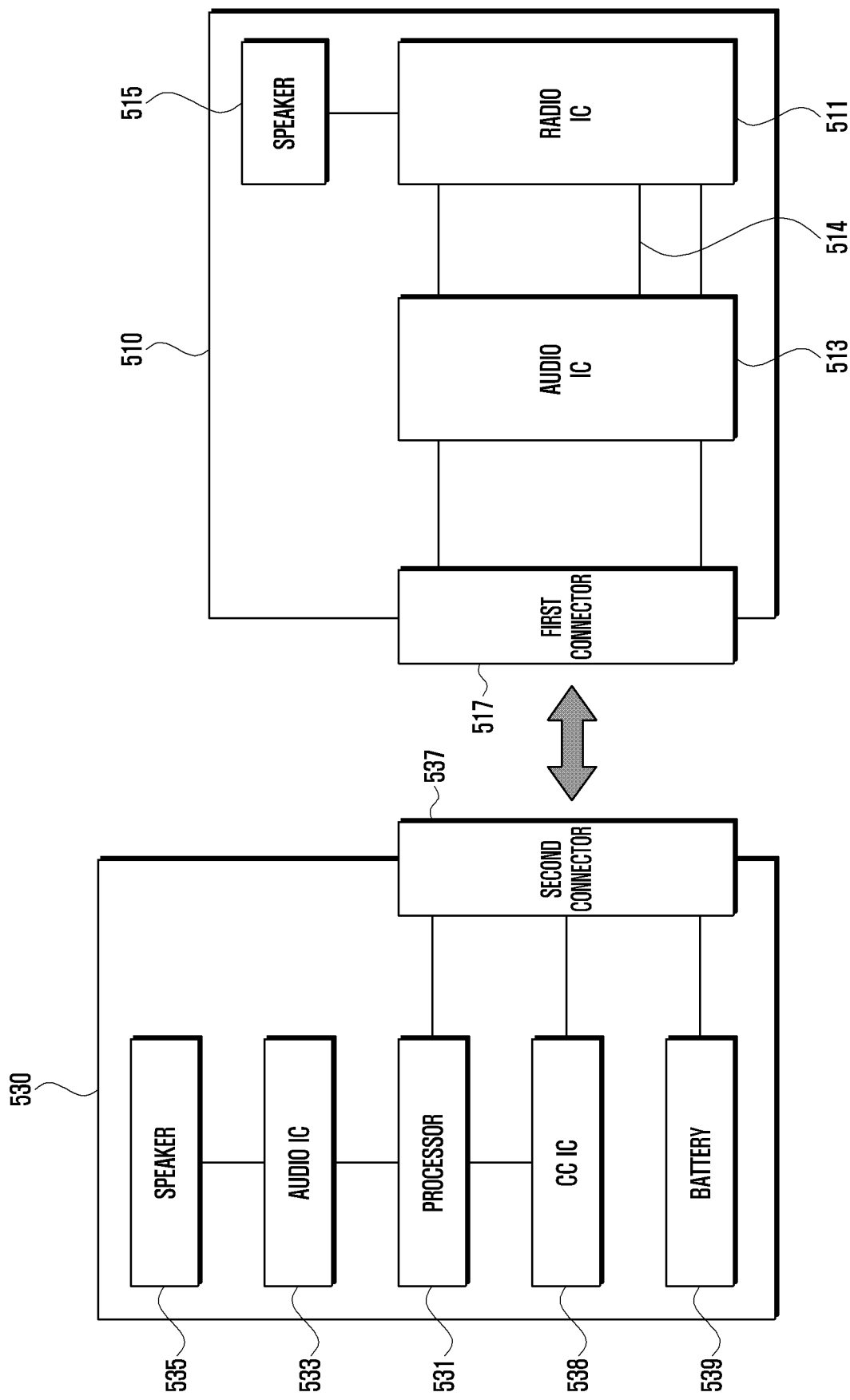
FIGS. 5A to 5D are block diagrams of a headset electronic device and an electronic device according to certain embodiments of the disclosure.

FIG. 5A is a block diagram of a headset electronic device 510 and an electronic device 530 according to certain embodiments.

When the headset electronic device 510 (e.g., headset electronic device 300 in FIG. 3A) and the electronic device 530 (e.g., electronic device 400 in FIG. 4A) are electrically connected to each other through mutual fastening between the first connector 517 (e.g., first connector 390 in FIG. 4A) and the second connector 537 (e.g., second connector 410 in FIG. 4A), the channel configuration (CC) IC 538 of the electronic device 530 may detect the type of the headset electronic device 510 through the CC1 and CC2 terminals (refer to FIG. 4B). For example, the CC IC 538 of the electronic device 530 may detect the type of headset electronic device 510 by recognizing an identification signal (e.g., digital ID or resistance ID) of the headset electronic device 510. The CC IC 538 may transmit type information of the headset electronic device 510 to the processor 531 (e.g., processor 120 in FIG. 1) of the electronic device 530. The processor 531 may receive the "type" information of the headset electronic device 510 from the CC IC 538 and check whether the corresponding headset electronic device 510 can perform a radio reception function. When the headset electronic device 510 is connected to the electronic device 530, power may be supplied from the battery 539 (e.g., battery 189 in FIG. 1) included in the electronic device 530 to the headset electronic device 510 through the VBUS terminal (refer to FIG. 4B). By the power supplied to the headset electronic device 510, the audio IC module 513 (e.g., audio IC module 330 in FIG. 3A), the radio IC module 511 (e.g., radio IC 370 in FIG. 3A), or the speaker 515 (e.g., speaker 311 in FIG. 3A) can work.

According to certain embodiments, if the headset electronic device 510 is capable of performing a radio reception function, the processor 531 of the electronic device 510 may prepare a library capable of processing radio-related functions. In one embodiment, the processor 531 may run a radio application. The radio application, for example, can be implemented as an application for controlling radio-related functions (e.g., activating and deactivating the radio reception function, changing or setting a radio channel, controlling sound output corresponding to a radio signal). The radio application may provide a user interface that allows the user to control radio-related functions.

According to certain embodiments, the processor 531 of the electronic device 510 may transmit a control signal according to a user's input to the radio IC 511 included in the headset electronic device 510. The control signal may be transmitted to the radio IC 511 through the D+/D− terminals of the connector 410 (see FIG. 4B). The radio IC 511 may process a radio signal based on the control signal. The radio IC 511 may be activated according to a radio operation signal included in the control signal. To receive a specific frequency of a specific channel according to a radio channel selection signal included in the control signal transmitted to the radio IC 511, the radio IC 511 may use frequency resonance filtering techniques. For example, the radio IC 511 may vary the resonant frequency of a frequency-variable band pass filter (BPF) included therein to match the frequency of a specific channel. By varying the resonant frequency of the frequency-variable BPF to the frequency of the specific channel, the frequency of the specific channel may be resonated and filtered. The radio IC 511 may extract an audio signal from the modulated radio signal. The radio IC 511 may amplify the audio signal to adjust the amplitude of the audio signal according to a volume control signal included in the control signal.

According to certain embodiments, a radio signal processed by the radio IC 511 may be received through the radio antenna 514. The radio antenna 514 may be included in the second line (e.g., second line 352 in FIG. 3A) connecting the audio IC 513 and the radio IC module 511. As another example, the radio antenna 514 may be included in the first line (e.g., first line 351 in FIG. 3A) connecting the radio IC 511 and the speaker 515.

The radio signal processed based on the control signal may be transmitted to the speaker 515 through the first line (e.g., first line 351 in FIG. 3A) of the connection line, and audio corresponding to the radio signal may be output through a unit of the speaker 515.

According to various embodiments, the radio IC module 511 may process a radio signal into a digital audio signal. The digital audio signal processed by the radio IC module 511 may be transmitted to the electronic device 530 through the first connector 517. The processor 531 of the electronic device 530 may transmit the digital audio signal to the audio IC module 533 (e.g., audio IC 170 in FIG. 2). The audio IC 533 of the electronic device 530 may convert the digital audio signal into an analog audio signal. The analog audio signal converted by the audio IC module 533 may be output from the speaker 535 included in the electronic device 530 and electrically connected to the audio IC module 533. When the radio IC module 511 processes a radio signal into a digital audio signal, the digital audio signal processed by the radio IC 511 may be transmitted to the audio IC 513 through the second line (e.g., the second line 352 connecting the radio IC 370 and the audio IC 330 in FIG. 3A). The audio IC 513 may convert the digital audio signal into an analog audio signal, and the converted analog audio signal may be transmitted to the speaker 515 via the radio IC module 511 through the second line (e.g., second line 352 in FIG. 3A).

In certain embodiments, the radio antenna 514 for receiving radio signals and the radio IC 511 for processing the received radio signals may be arranged in the headset electronic device 510. Hence, it is possible to prevent quality deterioration of a radio signal received and processed by the radio antenna 514 and the radio IC module 511 due to noise generated by the electronic device 530. To prevent deterioration of the radio signal quality due to noise generated during the operation of the audio IC 513, the radio antenna 514 and the radio IC module 511 can be disposed to be spaced apart from the audio IC 513.

According to certain embodiments, the processor 531 of the electronic device 530 may transmit a digital audio signal according to a continuously running audio application in the electronic device 530 to the audio IC 513 of the headset electronic device 510. The audio application may, for example, refer to an audio application for controlling functions related to audio reproduction (e.g., selection of an audio file to be reproduced, volume control, or equalization). The audio application may further provide a user interface that allows the user to control the functions related to audio reproduction. A digital audio signal may be transmitted from the electronic device 530 to the audio IC module 513 through D+/D− terminals of the connector, as shown in FIG. 4B. The audio IC 513 of the headset electronic device 510 may convert the digital audio signal received from the electronic device 530 into an analog audio signal and transmit it to the speaker 515. The analog audio signal may be transmitted to the speaker 515 via the radio IC module 511. Audio corresponding to the analog audio signal may be output from the speaker 515 of the headset electronic device 510.

Figure 5B:
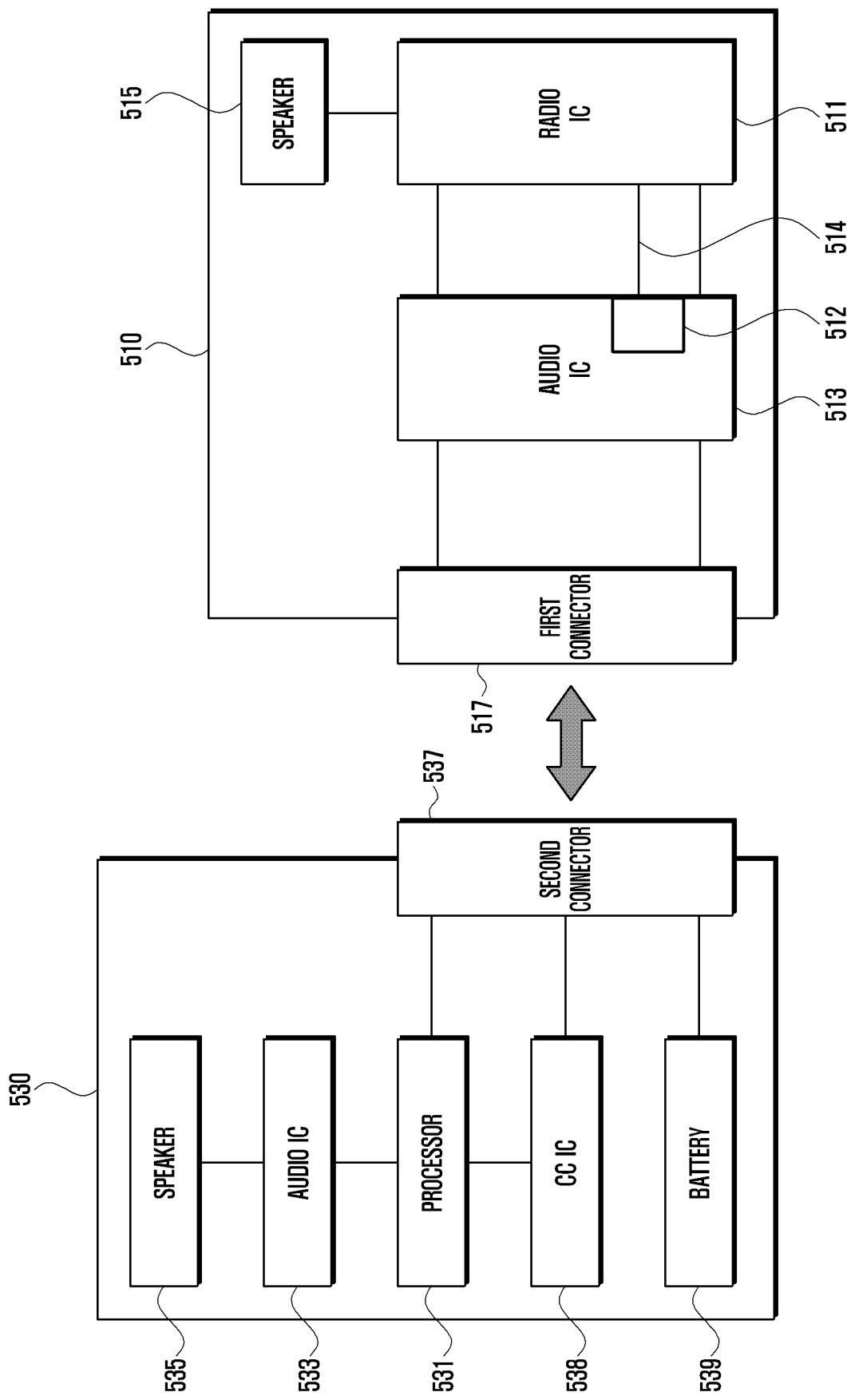

FIG. 5B is a block diagram of a headset electronic device 510 and an electronic device 530 according to an embodiment. The same reference symbols are used for the same components as those of FIG. 5A, and descriptions of the same operations will be omitted.

As shown in FIG. 5B, the radio antenna 514 of the headset electronic device 510 for receiving a radio signal may be embedded in the second line of the connection line electrically connecting the audio IC module 513 of the headset electronic device 510 and the radio IC 511 of the electronic device 530.

According to certain embodiments, the radio antenna 514 of the headset electronic device 510 may be connected to a noise blocking circuit 512. The noise blocking circuit 512 may be disposed between the radio antenna 514 and the audio IC module 513. For example, the noise blocking circuit 512 may be mounted on a printed circuit board on which the audio IC module 513 is mounted. The noise blocking circuit 512 may block noise generated from the audio IC 513 and the first connector 517 from flowing into the radio antenna 514. The radio antenna 514 connected to the noise blocking circuit 512 may maintain radio signal reception quality.

Figure 5C:
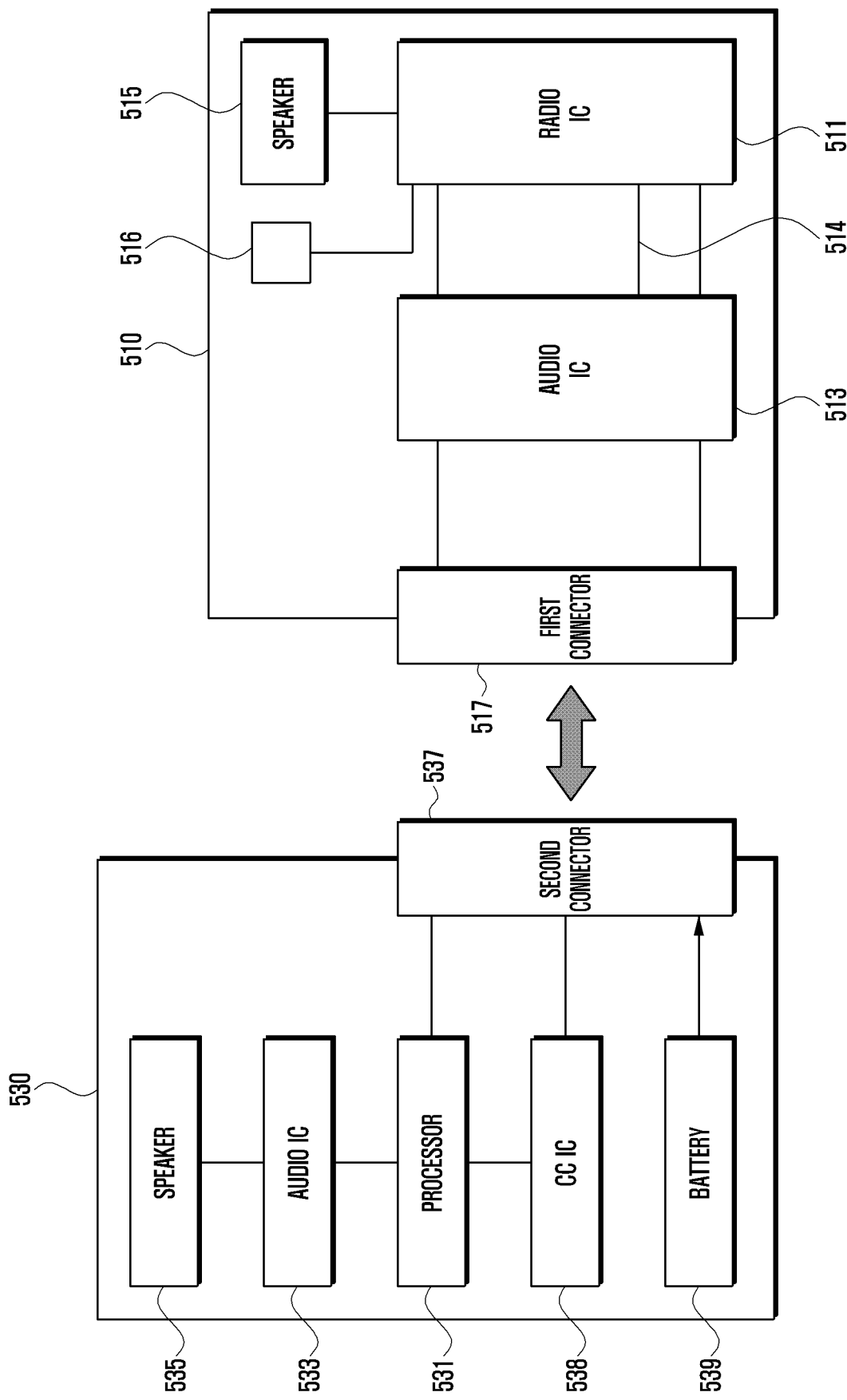

FIG. 5C is a block diagram of a headset electronic device 510 and an electronic device 530 according to certain embodiments. The same reference symbols are used for the same components as those of FIG. 5A, and descriptions of the same operations will be omitted.

As shown in FIG. 5C, the headset electronic device 510 may include a battery 516. The radio IC module 511, the audio IC module 513, or the speaker 515 may be operated using the battery 516 included in the headset electronic device 510. In other words, the headset electronic device 510 may operate independently of the electronic device 530. In this regard, it may be possible for the headset electronic device 510 alone to process a radio signal and output audio corresponding to the radio signal through the speaker 515.

Figure 5D:
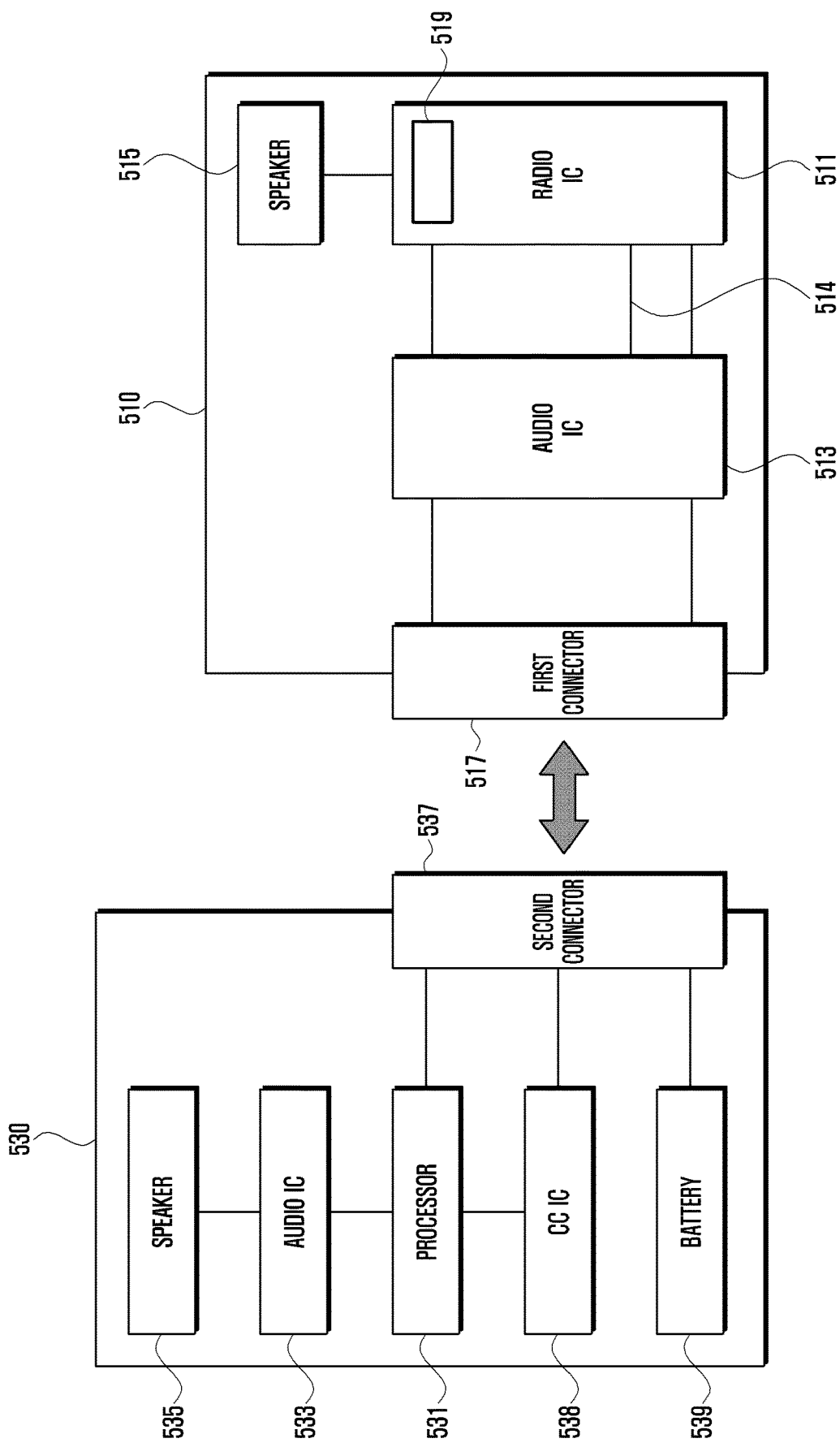

FIG. 5D is a block diagram of a headset electronic device 510 and an electronic device 530 according to certain embodiments. The same reference symbols are used for the same components as those of FIG. 5A, and descriptions of the same operations will be omitted.

According to certain embodiments, a digital audio signal transmitted by the electronic device 530 may be converted into an analog audio signal by the audio IC 513 of the headset electronic device 510. The analog audio signal may be transmitted to the speaker 515 via the radio IC module 511. The radio IC module 511 may include a speaker bypass 519 so that noise is not added while the analog audio signal passes through the radio IC module 511. The analog audio signal converted by the audio IC 513 may be directly transmitted to the speaker 515 through the speaker bypass 519.

A headset electronic device (e.g., headset electronic device 300 in FIG. 3A) according to certain embodiments may include: a headset housing (e.g., headset housing 310 in FIG. 3A); a speaker (e.g., speaker 311 in FIG. 3A) disposed inside the headset housing; a connector (e.g., connector 390 in FIG. 3A) for connection with an external electronic device (e.g., electronic device 400 in FIG. 4A); an audio IC module (e.g., audio IC 513 in FIG. 5A) electrically connected to the connector and configured to convert a digital audio signal into an analog audio signal; a connection line 350 electrically connecting the audio IC and the speaker; a radio IC module (e.g., radio IC 511 in FIG. 5A) disposed on the path of the connection line 350 and electrically connected to the connection line (e.g., connection line 350 in FIG. 3A); and a radio antenna (e.g., radio antenna 514 in FIG. 5A) connected to the radio IC, wherein the radio IC may be configured to receive a radio signal by using the radio antenna.

In addition, the radio antenna may receive at least one of FM signal, DMB signal, DAB+ signal, or ISDB-T signal.

In addition, the radio IC may be disposed to be spaced apart from the audio IC.

In addition, the connection line may include a first line (e.g., first line 351 in FIG. 3A) connecting the radio IC and the speaker, and a second line (e.g., second line 352 in FIG. 3A) connecting the radio IC and the audio IC.

In addition, the radio antenna may be embedded in at least one of the first line or the second line of the connection line.

In addition, the audio IC may further include a noise blocking circuit (e.g., noise blocking circuit 512 in FIG. 5B) for blocking RF noise, and the radio antenna embedded in the second line of the connection line may be connected to the noise blocking circuit.

In addition, the radio IC may receive a radio control signal through the connector and the connection line, and may process a radio signal based on the radio control signal.

In addition, the control signal received by the radio IC may include at least one of a volume control signal or a radio channel selection signal.

In addition, the connector may include a universal serial bus (USB) Type-C connector.

In addition, the connector and the audio IC may be included in one PCB.

In addition, the audio IC and the radio IC may be driven by power supplied through the connector from the external electronic device.

In addition, the headset electronic device may further include a battery (e.g., battery 516 in FIG. 5C) for supplying power to the audio IC and the radio IC.

In addition, to directly transmit an analog audio signal converted by the audio IC to the speaker, the radio IC may further include a speaker bypass (e.g., speaker bypass 519 in FIG. 5D) through which the analog audio signal passes.

In addition, the radio IC may process a radio signal received through the radio antenna into a digital form and transmit it to an external electronic device through the connection line and the connector.

In addition, the audio IC and the radio IC may be included in one PCB, and a noise blocking circuit (e.g., noise blocking circuit 512 in FIG. 5B) may be installed between the audio IC and the radio IC.

An electronic device (e.g., electronic device 101 in FIG. 1) according to various embodiments disclosed in this document may include: a processor (e.g., processor 120 in FIG. 1); and a connector (e.g., connector 410 in FIG. 4A) that is electrically connected to the processor and is fastened to a connector (e.g., connector 390 in FIG. 3A) of a headset electronic device (e.g., headset electronic device 300 in FIG. 3A) so as to interconnect the headset electronic device and the electronic device.

The processor may transmit a control signal to a radio IC (e.g., radio IC 511 in FIG. 5A) of the headset electronic device through the connector of the electronic device.

In addition, the control signal transmitted by the processor may include at least one of volume control signal, radio channel selection signal, or radio operation signal.

In addition, the electronic device may further include an embedded speaker (e.g., speaker 535 in FIG. 5A) that outputs a sound, and an audio IC (e.g., audio IC 533 in FIG. 5A) that is electrically connected to the embedded speaker and the processor and has a function of converting a digital audio signal into an analog audio signal.

The processor may receive, through the connector of the electronic device, a digital audio signal processed by the radio IC of the headset electronic device, and transmit the digital audio signal to the audio IC, and the audio IC may convert the digital audio signal into an analog audio signal and transmit it to the embedded speaker.

In an electronic device (e.g., electronic device 101 in FIG. 1) and a headset electronic device (e.g., headset electronic device 300 in FIG. 3A) connected thereto according to various embodiments disclosed in this document, the headset electronic device may include: a headset housing (e.g., headset housing 310 in FIG. 3A); a speaker (e.g., speaker 311 in FIG. 3A) disposed inside the headset housing; a connector (e.g., connector 390 in FIG. 3A) for connection with the electronic device; an audio IC (e.g., audio IC 513 in FIG. 5A) electrically connected to the connector and configured to convert a digital audio signal into an analog audio signal; a connection line (e.g., connection line 350 in FIG. 3A) electrically connecting the audio IC and the speaker; a radio IC (e.g., radio IC 511 in FIG. 5A) disposed on the path of the connection line and electrically connected to the connection line; and a radio antenna (e.g., radio antenna 514 in FIG. 5A) connected to the radio IC, wherein the radio IC may be configured to receive a radio signal by using the radio antenna, and the electronic device may include: a processor (e.g., processor 120 in FIG. 1); and a connector (e.g., connector 410 in FIG. 4A) that is electrically connected to the processor and is fastened to the connector of the headset electronic device so as to interconnect the headset electronic device and the electronic device, wherein the processor may transmit a control signal to the radio IC of the headset electronic device through the connector of the electronic device.

In addition, the radio IC of the headset electronic device may be disposed to be spaced apart from the audio IC of the headset electronic device.

Further, the embodiments of the disclosure disclosed in the present specification and drawings are provided as specific examples to easily describe the contents of the disclosure and help understanding, and are not intended to limit the scope of the disclosure. Therefore, the scope of the disclosure should be construed to include not only the embodiments disclosed in this document but also all changes or modifications derived based on the technical concept of the embodiments disclosed in this document.

It should be appreciated that various embodiments of the present disclosure and the terms used therein are not intended to limit the technological features set forth herein to particular embodiments and include various changes, equivalents, or replacements for a corresponding embodiment.

With regard to the description of the drawings, similar reference numerals may be used to refer to similar or related elements. It is to be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

While the present disclosure has been shown and described with reference to various embodiments thereof, it will be understood by those skilled in the art that various changes in form and details may be made therein without departing from the present disclosure as defined by the appended claims and their equivalents.

What is claimed is:

1. A headset electronic device comprising:
a headset housing;
a speaker disposed inside the headset housing;
a connector configured to detachably form an electrical connection with an external electronic device;
an audio IC module electrically connected to the connector and configured to convert a digital audio signal received from the external electronic device through the connector into an analog audio signal;
a connection line electrically connecting the audio IC module and the speaker;
a radio IC module arranged along the connection line and electrically connected to the connection line; and
a radio antenna connected to the radio IC module and configured to receive a radio signal.

2. The headset electronic device of claim 1, wherein the radio IC module is spaced apart from the audio IC module.

3. The headset electronic device of claim 1, wherein the connection line includes a
first line connecting the radio IC module and the speaker, and a second line connecting the radio IC module and the audio IC module.

4. The headset electronic device of claim 3, wherein the radio antenna is embedded
in at least one of the first line and the second line of the connection line.

5. The headset electronic device of claim 3,
wherein the audio IC module further includes a noise blocking circuit configured to block radio-frequency (RF) noise; and
wherein the radio antenna embedded in the second line of the connection line is connected to the noise blocking circuit.

6. The headset electronic device of claim 1, wherein the radio IC module is configured to receive a radio control signal through the connector and the connection line, and process the radio signal based on the radio control signal.

7. The headset electronic device of claim 6, wherein the radio control signal received by
the radio IC module includes at least one of a volume control signal and a radio channel selection signal.

8. The headset electronic device of claim 1, wherein the connector includes a universal serial bus (USB) Type-C connector.

9. The headset electronic device of claim 1, wherein the connector and the audio IC module is included in one printed circuit board (PCB).

10. The headset electronic device of claim 1, wherein, the radio IC module further includes a speaker bypass through which the analog audio signal passes for direct transmission from the audio IC module to the speaker.

11. The headset electronic device of claim 1, wherein the radio IC module is configured to process the radio signal received through the radio antenna into a digital radio signal and transmit the digital radio signal to the external electronic device through the connection line and the connector.

12. The headset electronic device of claim 1, wherein:
the audio IC module and the radio IC module are included in a single printed circuit board (PCB); and
a noise blocking circuit is arranged between and electrically connected to the audio IC module and the radio IC module configured to minimize noise interference between the audio IC module and the radio IC module.

13. An electronic device comprising:
a processor; and
a connector electrically connected to the processor, the connector configured to be detachably fastened to a connector of a headset electronic device so as to interconnect the headset electronic device and the electronic device and provide a digital audio signal to the connector of the headset electronic device, and
wherein the processor is configured to transmit a control signal to a radio IC module of the headset electronic device through the connector of the electronic device.

14. The electronic device of claim 13, wherein the control signal transmitted by the processor to the radio IC module of the headset electronic device includes at least one of a volume control signal, a radio channel selection signal, and a radio operation signal.

15. The electronic device of claim 13, further comprising:
an embedded speaker to output a sound; and
an audio IC module electrically connected to the embedded speaker;
wherein the processor is further configured to receive, through the connector of the electronic device, a digital audio signal processed by the radio IC module of the headset electronic device, and transmit the digital audio signal to the audio IC module of the headset electronic device, and
wherein the audio IC module is configured to convert the digital audio signal into an analog audio signal and transmit the analog audio signal to the embedded speaker.

16. The headset electronic device of claim 1, wherein the radio IC module is configured to process a radio signal from the radio antenna into an analog audio signal, and wherein the audio IC module is configured to convert the analog audio signal to a digital audio signal, and wherein the connector is configured to provide the digital audio signal to the external electronic device.

* * * * *